Aug. 24, 1943.  R. E. BROWN  2,327,494
LOADER
Filed Sept. 28, 1942     3 Sheets-Sheet 1

Inventor
Roy E. Brown,
By McMorrow and Berman
Attorneys

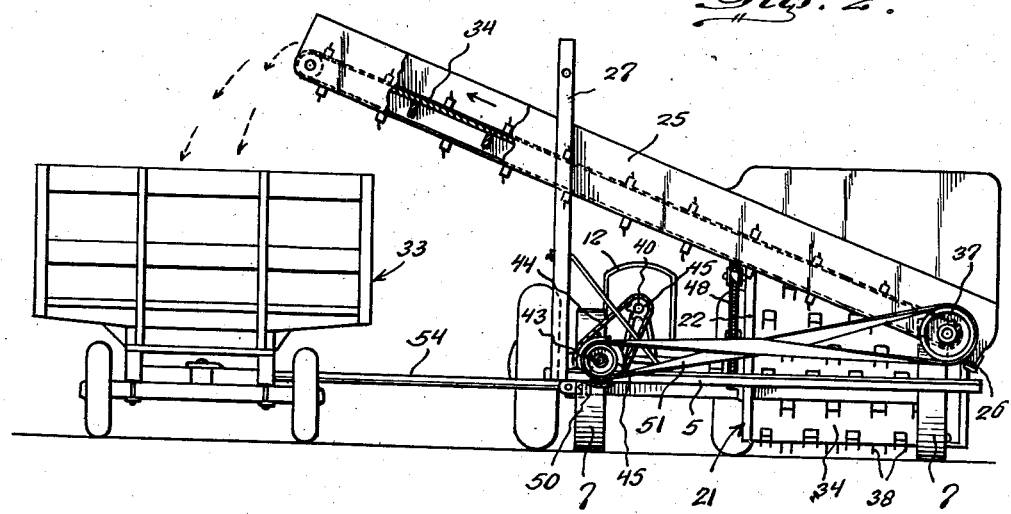
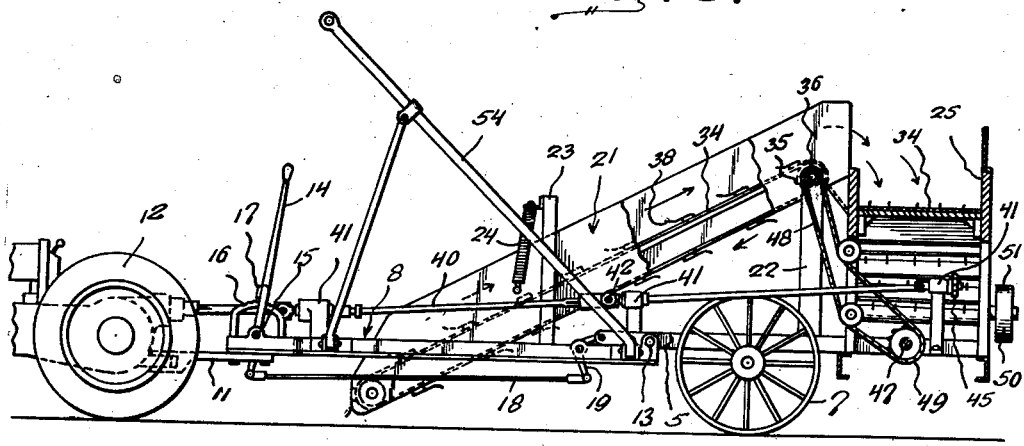

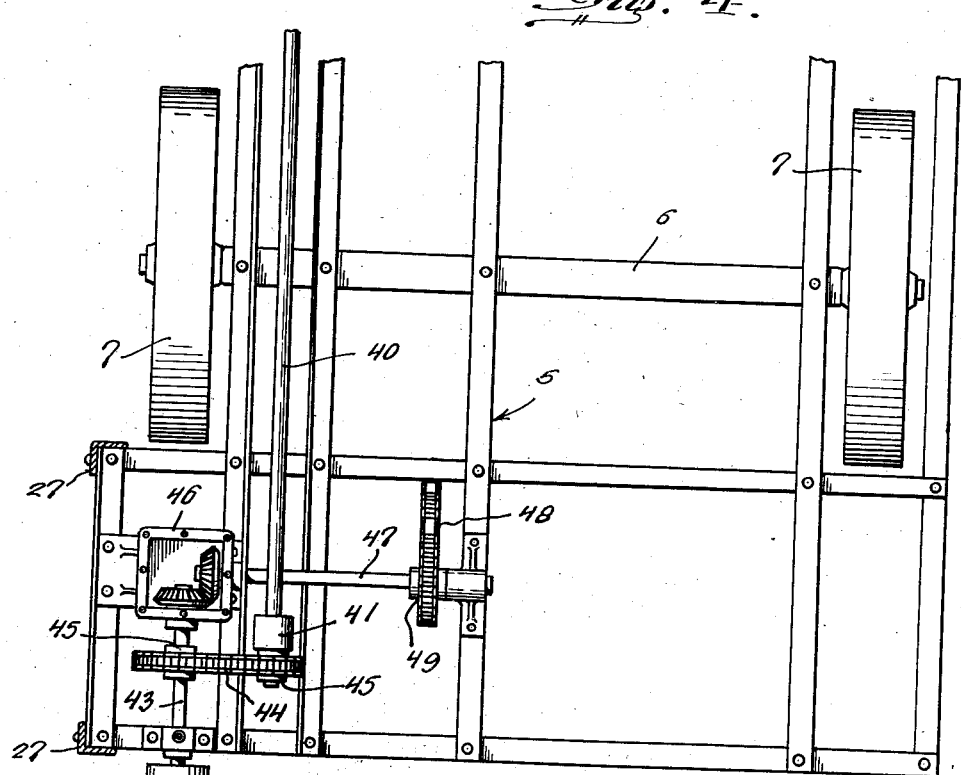

Patented Aug. 24, 1943

2,327,494

UNITED STATES PATENT OFFICE 2,327,494

LOADER

Roy E. Brown, Sterling, Ill.

Application September 28, 1942, Serial No. 459,991

1 Claim. (Cl. 214—41)

This invention relates to a loader for loading material onto wagons or other conveyances, and is especially adapted for loading green peas including the vines thereof onto a wagon after the cutting and raking of the vines into windrows.

The primary object of this invention is the provision of a device of the above stated character which may be pulled and powered by a tractor and includes a hitch for a wagon to be attached thereto, so that vines containing peas may be rapidly taken up from windrows and delivered into the wagon, materially reducing the time and manpower heretofore required for this type of work.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view partly in section illustrating a loader constructed in accordance with my invention and showing the loader coupled to a fragmentary portion of a tractor and a wagon or similar conveyance coupled to said loader.

Figure 2 is a rear elevation, partly in section, illustrating the device with the wagon or conveyance coupled thereto and receiving the material taken up by the loader.

Figure 3 is a side elevation, partly in section, showing the drive means between the conveyors of the device and the tractor.

Figure 4 is a fragmentary plan view, partly in section, showing the main frame of the loader and a portion of the drive means.

Figure 5 is a fragmentary transverse sectional view showing the means of raising and lowering the delivery conveyor.

Figure 6 is a fragmentary sectional view illustrating a portion of one of the conveyors and one of the flight-forming elements of the conveyor.

Figure 1:
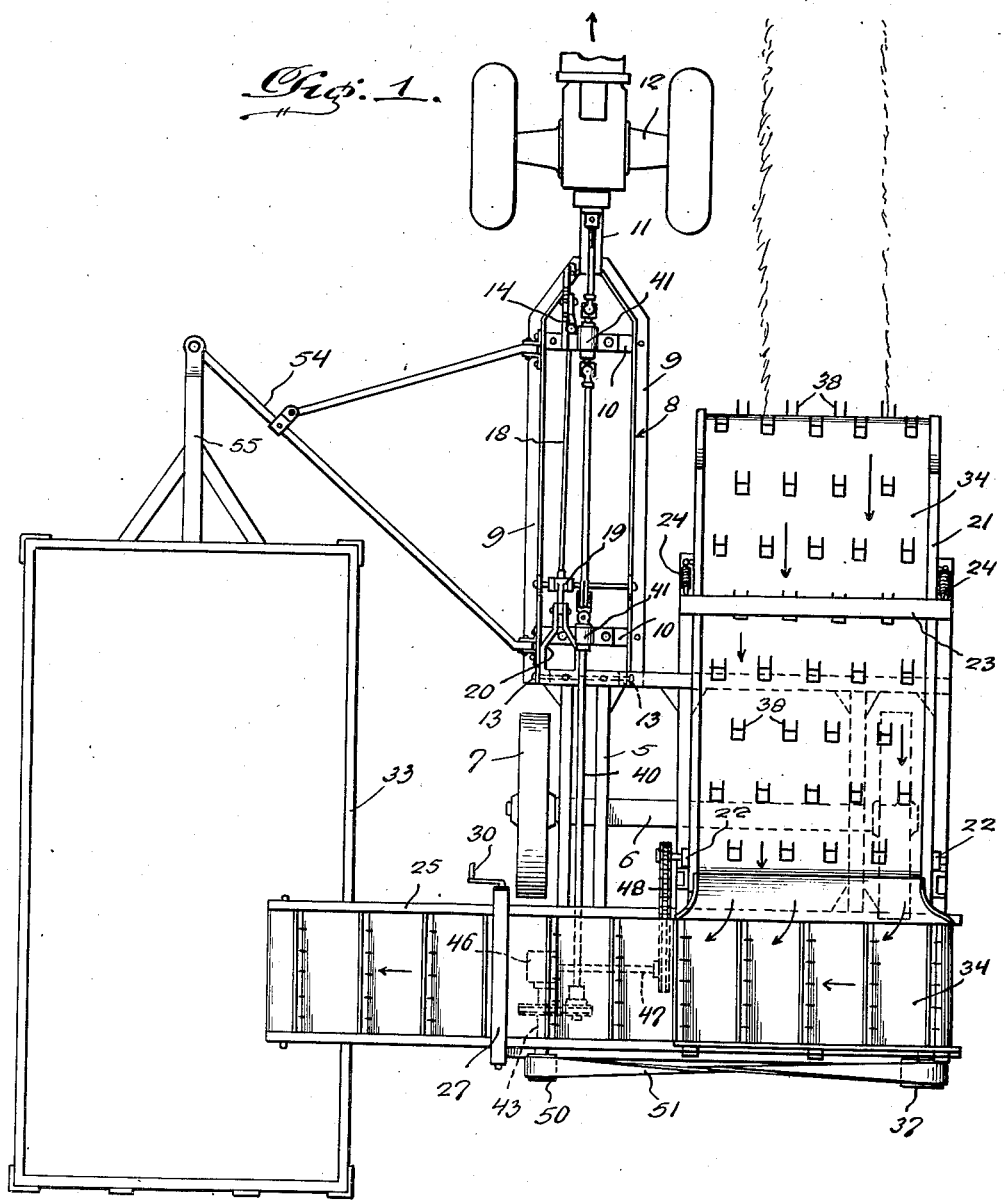

Referring in detail to the drawings, the numeral 5 indicates a main frame mounted on an axle 6 supported by a pair of ground wheels 7. The axle 6 extends transversely of the main frame and is located substantially intermediate the ends of said frame. A draft hitch 8, in the form of an elongated frame, is hinged or pivoted to the main frame 5 in substantial alignment with one of the ground wheels 7 and includes spaced bars 9 connected by transverse braces 10.

The forward ends of the members 9 are converged and connected to a clevis 11 employed for coupling the draft member 8 to the usual draft bar or similar device on a tractor 12. The hinge between the draft member 8 and the main frame 5 is indicated by the character 13.

In order that the main frame may be tilted with the axle acting as the pivot therefor and relative to the draft member 8, a control lever 14 is pivotally mounted on the forward portion of the draft member, as shown at 15, and operates in conjunction with a quadrant 16. The detent of the control lever is indicated by the character 17.

A connecting rod 18 is pivoted to the control lever and to a bell crank lever 19 pivotally mounted on the draft member 8 adjacent the rear end of the latter. The bell crank lever is pivotally connected to a bracket 20 secured on the main frame. By varying the position of the control lever, the main frame may be caused to pivot on the ground wheels, the purpose of which is to vary the receiving end of a gathering conveyor 21 with relation to the ground.

The gathering conveyor 21 has the discharge end thereof pivotally mounted on uprights 22 carried by the main frame 5. The gathering conveyor extends downwardly and forwardly from its pivot locating the receiving end of the gathering conveyor laterally of the draft member 8 and in close proximity to the ground.

A frame 23 mounted on the main frame 5 straddles the conveyor and is connected thereto by coil springs 24 acting to yieldably support the forward end of the receiving conveyor with relation to the ground so that if an obstruction is engaged, the receiving end of said conveyor may raise upwardly and pass over the obstruction.

A delivery conveyor 25 is arranged transversely of the main frame 5 and is pivoted thereto, as shown at 26. The delivery conveyor 25 extends freely through a supporting frame 27 mounted on the main frame 5 and has connected thereto flexible elements 28 which are wound on and secured to an operating shaft 29 journaled on the frame 27. The operating shaft 29 may be manually rotated in either direction by a crank 30 and held against rotation by a dog 31 engaging a gear 32 secured to said shaft 29. The dog 31 is pivotally mounted on the frame 27 and may be manually engaged and disengaged with the gear.

Through the arrangement of the shaft 29 and flexible elements, the discharge end of the delivery conveyor may be raised and lowered to various heights for the purpose of delivering the gathered material into a vehicle 33 traveling alongside of the loader.

The conveyors 21 and 25 each include an endless apron 34 supported by rollers 35 and one of the rollers has a sprocket gear 36 connected thereto. The sprocket gear 36 is located on the conveyor 21 while one of the rollers of the conveyor 25 has a pulley 37 secured thereto. The endless apron 34 of the conveyors 21 and 25 have secured thereto and arranged transversely thereof flight-forming elements 38 each presenting a hook shaped portion and a coiled portion 39. The coiled portions 39 tension the hook shaped portions. The hook shaped portions are adapted to engage with the material and cause the latter to travel with the upper run of the endless aprons of the conveyors 21 and 25.

It is to be understood that the material discharges from the gathering conveyor into the delivery conveyor, as shown in Figure 3, and is discharged from the delivery conveyor into the wagon or like conveyance, as shown in Figure 2.

A power shaft 40 is journaled in bearings 41 carried by the main frame 5 and the draft member 8 and is composed of a plurality of sections coupled by universal joints 42. One of the sections of the power shaft has a splined connection with one of the universal joints so that said power shaft may automatically lengthen and shorten to compensate for the tilting of the main frame relative to the draft member 8. The forward end of the power shaft is coupled to the power take-off of the tractor. The power shaft 40 drives a shaft 43 journaled on the main frame by a sprocket chain 44 and sprocket gears 45. The shaft 43 extends into a gear box 46 and is geared to a shaft 47. A sprocket chain 48 trained over a sprocket gear 49 secured on the shaft 47 drives the endless apron of the conveyor 21 by being trained over the sprocket gear 36. A pulley 50 is secured to the shaft 43 and a belt 51 connects the pulley 50 to the pulley 37. The runs of the belt 51 are crossed, as clearly shown in Figures 1 and 2. Thus it will be seen that power derived from the tractor, may be employed for driving the conveyors 21 and 25, the conveyor 21 acting to gather the vines from the windrows and deliver them into the conveyor 25 which discharges the vines into the wagon or conveyance 33.

A draft hitch 54 is pivotally mounted on the draft member 8 and may be coupled to the draft tongue 55 of the wagon 33 so that the wagon will be made to travel alongside of the loader, the tractor acting to pull both the loader and the wagon as well as to drive the conveyors.

Thus it will be seen that vegetation raked in windrows may be rapidly and easily gathered by this device and delivered into a wagon or similar conveyance, all under the power of a tractor, consequently saving time in which to gather such material and reduces to a minimum the amount of manpower necessary to carry out such work.

While I have shown and described the preferred embodiment of my invention, it will be understood that minor changes in construction, combination and arrangement of parts may be made without departing from the spirit and scope of the invention as claimed.

Having thus described my invention, what I claim is:

In a loader, a tiltable main frame of substantially rectangular shape, a pair of ground wheels supporting said frame, gathering and delivering conveyors pivotally mounted on the frame with the gathering conveyor extending downwardly and forwardly of the frame and laterally of one of the ground wheels and disposed over the other ground wheel, an elongated draft frame having one end pivoted on the main frame substantially in alignment with one of the ground wheels and laterally of the gathering conveyor and having the forward end contracted and coupled to a tractor, a power shaft journaled on the frame and coupled to a power take off of the tractor and including sections joined by universal joints and one of the sections having a slidable drive connection with one of the joints, a drive means connecting the shaft to the conveyors, a raising and lowering means for the delivery conveyor, means yieldably supporting the gathering conveyor for movement on its pivot when engaging an obstruction, a manually operated lever mounted for pivotal movement on the forward end of the draft frame, a bell crank lever pivotally connected to the main frame and pivotally mounted on the rear end of the draft frame, a connecting link pivotally connecting the control lever to the bell crank lever whereby through the manipulation of the control lever the main frame may be tilted on the ground wheels, and a draft member pivoted to one side of the draft frame and coupled to a vehicle for pulling the latter in a position under the discharge end of the delivery conveyor.

ROY E. BROWN.